US011403182B2

(12) United States Patent
Patel et al.

(10) Patent No.: US 11,403,182 B2
(45) Date of Patent: Aug. 2, 2022

(54) METHOD AND SYSTEM FOR ANY-POINT IN TIME RECOVERY WITHIN TRADITIONAL STORAGE SYSTEM VIA A CONTINUOUS DATA PROTECTION INTERCEPTOR

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: DELL PRODUCTS L.P., Hopkinton, MA (US)

( * ) Notice: Subject to any disclaimer, the term of this patent is extended or adjusted under 35 U.S.C. 154(b) by 0 days.

(21) Appl. No.: 16/553,336

(22) Filed: Aug. 28, 2019

(65) Prior Publication Data

US 2021/0064477 A1 Mar. 4, 2021

(51) Int. Cl.
*G06F 3/06* (2006.01)
*G06F 11/14* (2006.01)

(52) U.S. Cl.
CPC .......... *G06F 11/1453* (2013.01); *G06F 3/065* (2013.01); *G06F 3/067* (2013.01); *G06F 3/0619* (2013.01); *G06F 3/0641* (2013.01); *G06F 11/1435* (2013.01)

(58) Field of Classification Search
CPC ........ G06F 3/0619; G06F 3/065; G06F 3/067; G06F 11/1435; G06F 11/1453; G06F 3/0641
See application file for complete search history.

(56) References Cited

U.S. PATENT DOCUMENTS

| 6,445,705 | B1 | 9/2002 | Holden |
| 10,852,989 | B1 | 12/2020 | Patel |
| 2010/0262772 | A1 | 10/2010 | Mazina |
| 2013/0103650 | A1* | 4/2013 | Natanzon ............ G06F 11/2069 707/684 |
| 2015/0293817 | A1 | 10/2015 | Subramanian |
| 2016/0259693 | A1 | 9/2016 | Sundararaman |
| 2017/0346898 | A1* | 11/2017 | Baptist .................. G06F 11/106 |
| 2018/0018235 | A1* | 1/2018 | Arslan ................ H03M 13/356 |
| 2019/0056865 | A1 | 2/2019 | Tripathi |

* cited by examiner

*Primary Examiner* — Michelle T Bechtold
(74) *Attorney, Agent, or Firm* — Chamberlain, Hrdlicka, White, Williams & Aughtry

(57) ABSTRACT

A method for managing data includes obtaining, by a first storage controller, a write request associated with an object from a host, applying an erasure coding procedure to data associated with the write request to obtain a plurality of data chunks and at least one parity chunk, wherein object comprises the data, deduplicating the plurality of data chunks to obtain a plurality of deduplicated data chunks, generating storage metadata associated with the plurality of data chunks and the at least one parity chunk, generating an object entry associated with the plurality of data chunks, storing, across a first plurality of persistent storage devices, the plurality of deduplicated data chunks and the at least one parity chunk, and storing, via a continuous data protection interceptor executing on the first storage controller, in at least one of a second plurality of persistent storage devices the object entry.

17 Claims, 8 Drawing Sheets

METHOD AND SYSTEM FOR ANY-POINT IN TIME RECOVERY WITHIN TRADITIONAL STORAGE SYSTEM VIA A CONTINUOUS DATA PROTECTION INTERCEPTOR

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate and store data may impact the overall performance of the computing resources.

SUMMARY

In general, in one aspect, the invention relates to a method for managing data. The method includes obtaining, by a first storage controller, a write request associated with an object from a host, applying an erasure coding procedure to data associated with the write request to obtain a plurality of data chunks and at least one parity chunk, wherein object comprises the data, deduplicating the plurality of data chunks to obtain a plurality of deduplicated data chunks, generating storage metadata associated with the plurality of data chunks and the at least one parity chunk, generating an object entry associated with the plurality of data chunks, storing, across a first plurality of persistent storage devices, the plurality of deduplicated data chunks and the at least one parity chunk, and storing, via a continuous data protection (CDP) interceptor executing on the first storage controller, in at least one of a second plurality of persistent storage devices the object entry.

In general, in one aspect, the invention relates to a non-transitory computer readable medium that includes computer readable program code, which when executed by a computer processor enables the computer processor to perform a method for managing data. The method includes obtaining, by a first storage controller, a write request associated with an object from a host, applying an erasure coding procedure to data associated with the write request to obtain a plurality of data chunks and at least one parity chunk, wherein object comprises the data, deduplicating the plurality of data chunks to obtain a plurality of deduplicated data chunks, generating storage metadata associated with the plurality of data chunks and the at least one parity chunk, generating an object entry associated with the plurality of data chunks, storing, across a first plurality of persistent storage devices, the plurality of deduplicated data chunks and the at least one parity chunk, and storing, via a continuous data protection (CDP) interceptor executing on the first storage controller, in at least one of a second plurality of persistent storage devices the object entry.

In general, in one aspect, the invention relates to a data cluster that includes a first storage controller, a continuous data protection (CDP) interceptor executing on the first storage controller, a second storage controller, a first plurality of persistent storage devices, and a second plurality of persistent storage devices, wherein the first storage controller is programmed to: obtain a write request associated with an object from a host, apply an erasure coding procedure to data associated with the write request to obtain a plurality of data chunks and at least one parity chunk, wherein object comprises the data, deduplicate the plurality of data chunks to obtain a plurality of deduplicated data chunks, generate storage metadata associated with the plurality of data chunks and the at least one parity chunk, generate an object entry associated with the plurality of data chunks, store, across the first plurality of persistent storage devices, the plurality of deduplicated data chunks and the at least one parity chunk, and store, via the CDP interceptor, the object entry in at least one of the second plurality of persistent storage devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
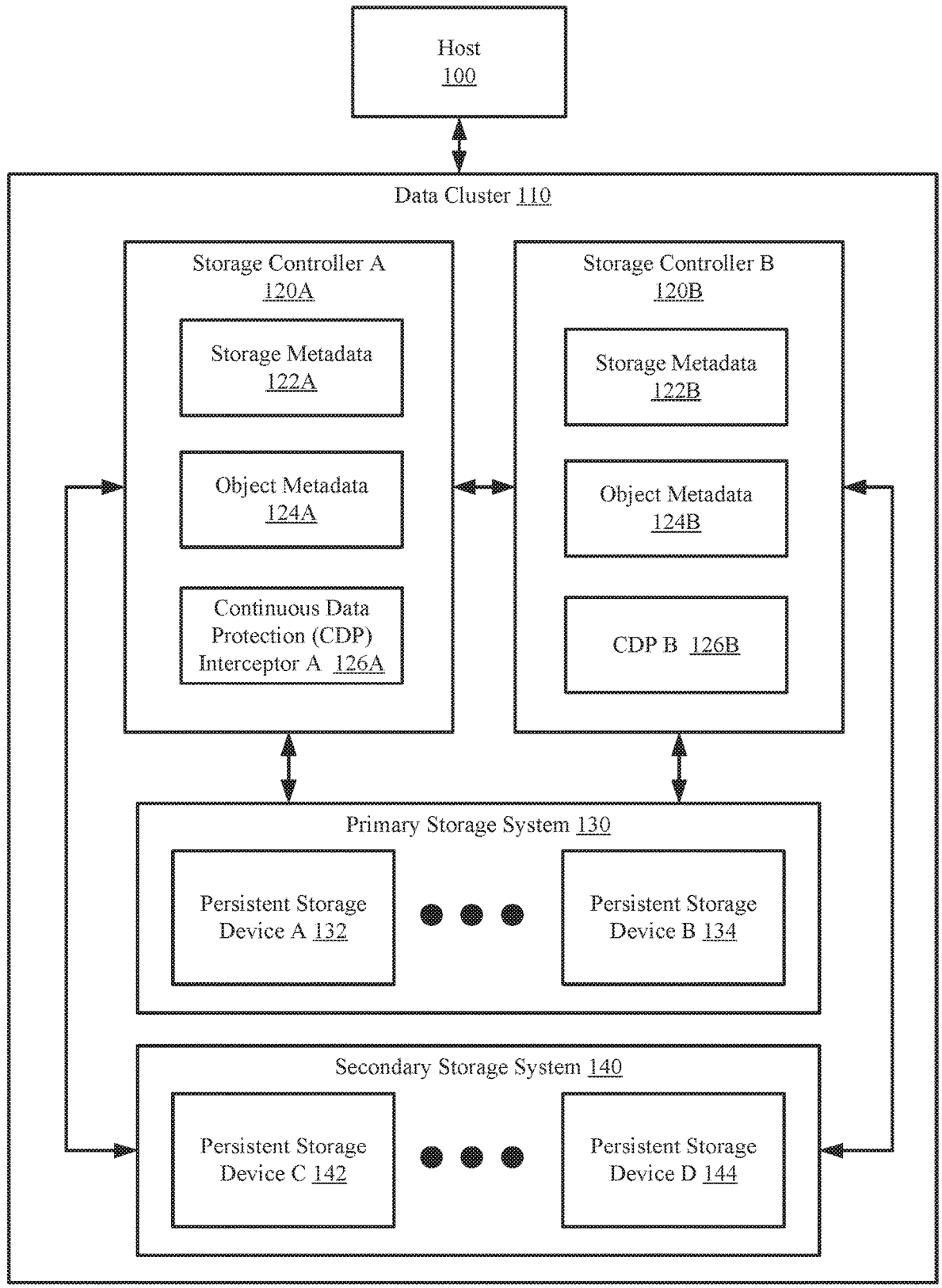
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data in a data cluster. Embodiments of the invention may utilize a storage controller that applies an erasure coding procedure on data obtained from a host to divide the data into data chunks and to generate parity chunks using the data chunks. Optionally, the storage controller may then perform deduplication on the data chunks to generate deduplicated data that includes deduplicated data chunks. The deduplicated data chunks and the parity chunks are subsequently distributed to persistent storage devices in a primary storage system in accordance with an erasure coding procedure.

In one or more embodiments of the invention, each storage controller in the data cluster stores storage metadata and object metadata. The storage metadata may specify the persistent storage devices in which each data chunk and parity chunk is stored. The object metadata may specify the data chunks and parity chunks and an object identifier (ID) associated with the data chunks and parity chunks. The storage metadata and the object metadata may be distributed to the storage controllers in the data cluster to maintain storage metadata consistency.

In one or more embodiments of the invention, each storage controller is further equipped with a continuous data protection (CDP) interceptor. When a storage controller obtains a write request associated with the object, the storage controller may store the data associated with the write request in a primary storage system. Any previous data associated with the object may be overwritten in the primary storage system and stored in a secondary storage system. The CDP interceptor may be programmed to further store a copy of the object metadata associated with the write request to the secondary storage system. By storing the object metadata in the secondary storage system, the object may be replayed, i.e., the state of an object at a given point time (specified in the object metadata) may be re-generated.

FIG. 1 shows an example system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be backups of databases, files, applications, and/or other types of data without departing from the invention.

Figure 5:
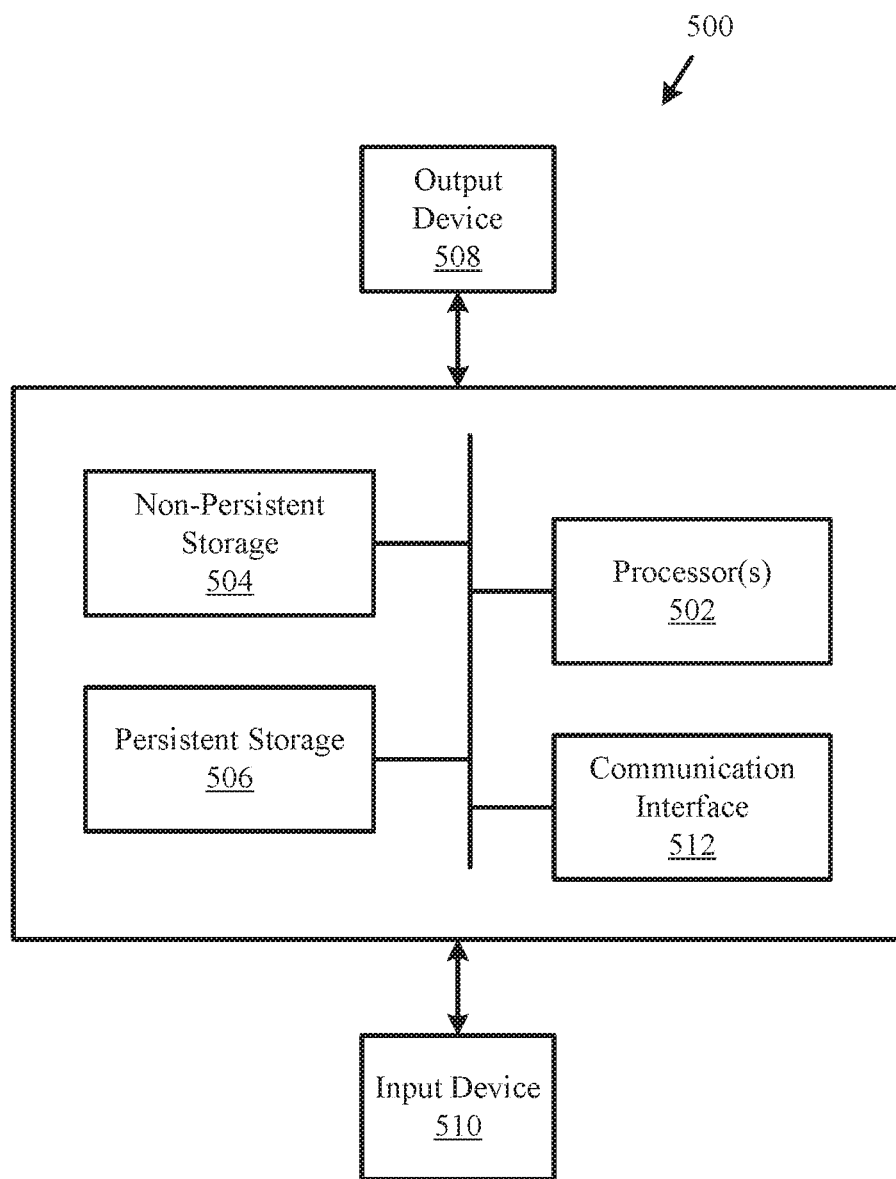
FIG. 5 shows a diagram of a computing device in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data generated by the host (100). The data may be deduplicated versions of data obtained from the host. The data cluster may, via an erasure coding procedure, store portions of the deduplicated data across persistent storage devices operating in the data cluster (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

Continuing with the discussion of FIG. 1, the data cluster (110) may include at least two storage controllers (120A, 120B), a primary storage system (130), and a secondary storage system (140). The storage controllers (102A, 120B) may each store storage metadata (122A, 122B), object metadata (124A, 124B), and may include a continuous data protection (CDP) interceptor (126A, 126B). Each of the aforementioned components may be operatively connected via any combination of wired and/or wireless connections. Each of the aforementioned components is discussed below.

In one or more embodiments of the invention, a storage controller (120A, 120B) is a device that includes functionality to perform deduplication on data obtained from a host (e.g., 100). A storage controller (e.g., 120A) may utilize information useful to perform the aforementioned functionality. The information may be storage metadata (e.g., 122A). In one or more embodiments of the invention, the storage metadata (122A, 122B) is a data structure that stores unique identifiers of portions data stored in the data cluster (110). The unique identifiers stored in the storage metadata (122A, 122B) may be used to determine whether a data chunk of the obtained data is already present elsewhere in the data cluster (110) (specifically, the primary storage system (130)). The storage controller (120A) may use the storage information to perform the deduplication and generate deduplicated data. After deduplication, an erasure coding procedure may be performed on the data in order to generate parity chunks. The storage controllers (120A, 120B) may perform the deduplication and erasure coding procedure via the method illustrated in FIG. 3A.

In one embodiment of the invention, the storage controller may not implement deduplication. In such scenarios, the data is divided into data chunks (which are not deduplicated) and then parity chunks are generated using the aforementioned data chunks. The data and parity chunks are then distributed to the persistent storage devices in accordance with the erasure coding procedure.

Additionally, in one or more embodiments of the invention, the storage controller may not implement erasure coding. In such scenarios, the data is divided into data chunks (which may or may not be deduplicated) and distributed to the persistent storage devices without generating parity chunks.

In one or more embodiments of the invention, the storage metadata (122A, 122B) is a data structure that specifies the data chunks (which may or may not be deduplicated) and the parity chunks stored in the data cluster (110). The storage metadata (122, 124) may further store storage location information of the data chunks and parity chunks.

In one or more embodiments of the invention, the storage metadata (122, 124) is stored in the storage controllers (120A, 120B). A copy of the storage metadata (124) may be distributed to a second storage controller (120B) (or multiple other storage controllers (not shown)) after data associated with the storage metadata (122) is generated and stored in the primary storage system (130). In this manner, if the storage metadata (122) stored in the first storage controller (120A) experiences a failure (e.g., it becomes unavailable, corrupted, etc.), the storage metadata (124) may be recovered from the second storage controller (120B). For additional details regarding the storage metadata (122, 124), see, e.g., FIG. 2A.

In one or more embodiments of the invention, the object metadata (124A, 124B) is a data structure that specifies data chunks associated with an object. The object metadata (124A, 124B) includes object information about the data stored in the data cluster (110). An object may be, for example, a file, a set of files, a portion of a file, a backup of any combination thereof, and/or any other type of data without departing from the invention. The object metadata may include any number of object entries. For additional details regarding the object metadata, see, e.g., FIG. 2B.

In one or more embodiments of the invention, the CDP interceptors (126A, 126B) facilitate the storage of object metadata (124A, 124B) in the secondary storage system (140) and/or the replay of an object to a previous point in time. The CDP interceptors (126A, 126B) may intercept requests to store data obtained by the storage controllers (120A, 120B) and generate object entries associated with the requests and send copies of the object entries to the secondary storage system (140) to be stored. A copy of a portion of most (or more) recent object entries may be additionally stored in the primary storage system (130) and/or in one or more storage controllers (120A, 120B).

In one or more embodiments of the invention, the CDP interceptors (126A, 126B) further include functionality for performing object replay of objects at specified points in time. The CDP interceptors (126A, 126B) may use: (i) object metadata stored in the storage controllers (e.g., 124A, 124B), (ii) object metadata stored in the secondary storage system (140), (iii) storage metadata (122A, 122B) stored in the storage controllers (120A, 120B), or (iv) any combination thereof, to perform the aforementioned functionality.

Figure 3A:
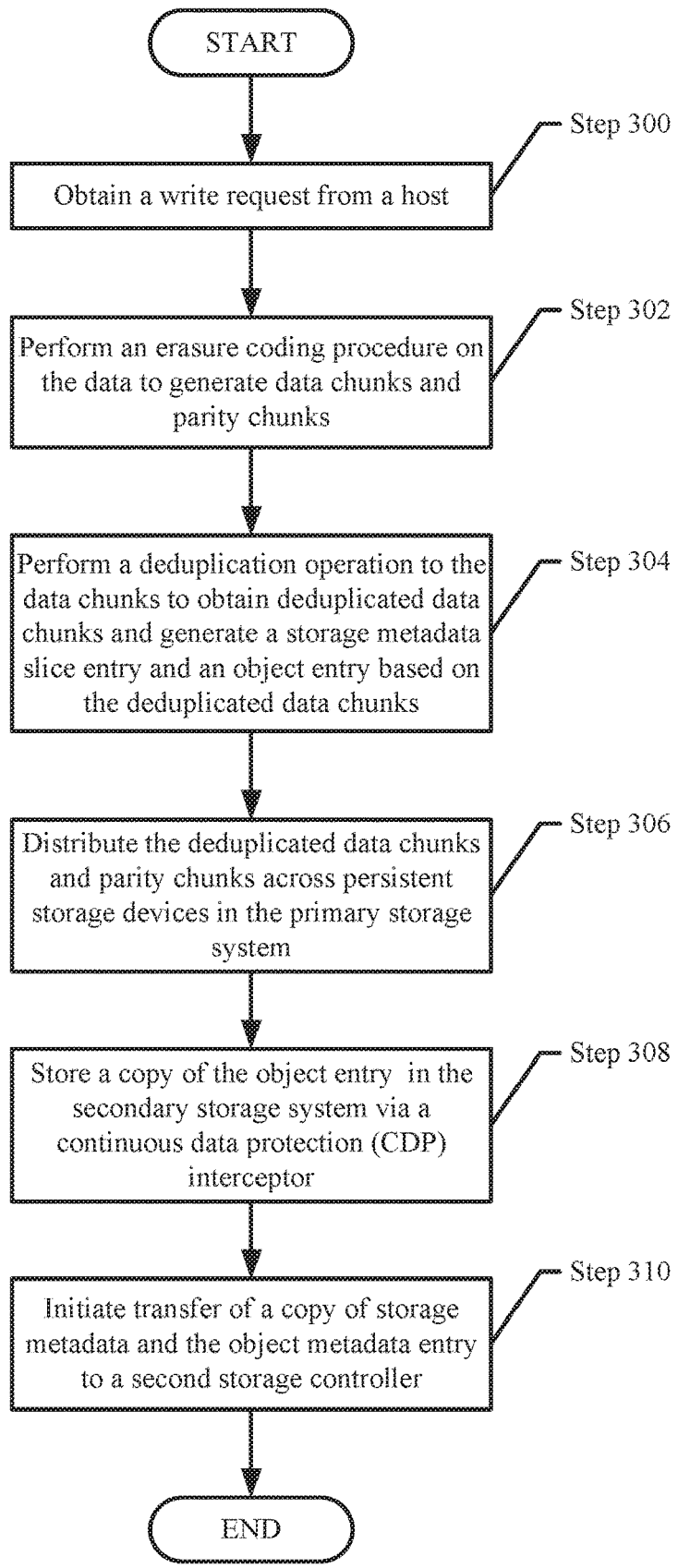
FIG. 3A shows a flowchart for storing data in a data cluster in accordance with one or more embodiments of the invention.
Figure 3B:
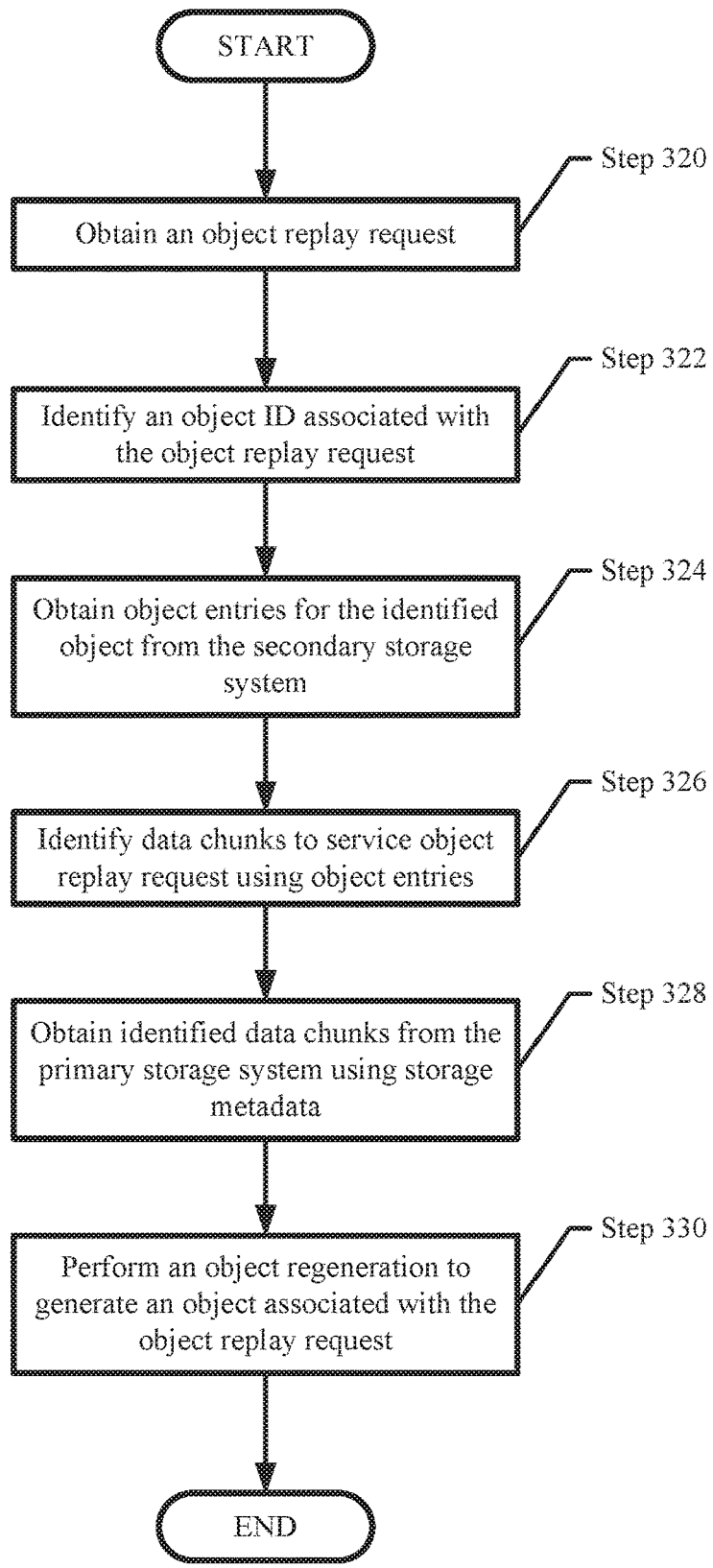
FIG. 3B shows a flowchart for performing an object replay in accordance with one or more embodiments of the invention.

In one or more of embodiments of the invention, each CDP interceptor (126A, 126B) is implemented as computer instructions, e.g., computer code, stored on a persistent storage that when executed by a processor of a storage controller (120A, 120B) cause the storage controller (120A, 120B) to provide the aforementioned functionality of the CDP interceptor (120A, 120B) described throughout this application and/or all, or a portion thereof, of the method illustrated in FIGS. 3A-3B.

In one or more embodiments of the invention, each CDP interceptor (126A, 126B) is a hardware device including circuitry. The CDP interceptor (126A, 126B) may be, for example, a digital signal processor, a field programmable gate array, or an application specific integrated circuit. The CDP interceptor (126A, 126B) may be other types of hardware devices without departing from the invention.

In one or more embodiments of the invention, the storage controllers (120A, 120B) are each implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the storage controller (120A, 120B) described throughout this application and/or all, or a portion thereof, of the methods illustrated in FIGS. 3A-3B.

In one or more embodiments of the invention, the storage controllers (120A, 120B) are each implemented as a logical device. The logical device may utilize the computing resources of any number of computing devices and thereby provide the functionality of the storage controllers (120A, 120B) described throughout this application and/or all, or a portion thereof, of the methods illustrated in FIGS. 3A-3B.

In one or more embodiments of the invention, the primary storage system (130) includes persistent storage devices (132, 134). In one or more embodiments of the invention, the persistent storage devices (132, 134) store data. The data may be data chunks and/or parity chunks. The generation of the data chunks and parity chunks is described below with respect to FIG. 3A.

In one or more embodiments of the invention, a data chunk is a data structure that includes a portion of data that was obtained from a host (100). The data chunks may be deduplicated by a storage controller (120A, 120B). Each of the data chunks may be used by the storage controller (120A, 120B)) to reconstruct another data chunk or a parity chunk based on an erasure coding algorithm that was applied to the other data chunk or parity chunk.

In one or more embodiments of the invention, a parity chunk is a data structure that includes a parity value generated using an erasure coding algorithm. The parity value may be generated by applying the erasure coding algorithm to one or more data chunks stored in the primary storage system (130). Each of the parity chunks may be used by a storage controller (120A, 120B), along with other data chunks and/or parity chunks, to reconstruct another parity chunk or a data chunk based on an erasure coding algorithm that was applied to the other parity chunk or data chunk.

The persistent storage devices (132, 134) may be (or include) non-volatile storage. In other words, the data stored in the persistent storage devices (132, 134) does not get lost or removed when the persistent storage devices (132, 134) lose power. Each of the persistent storage devices (132, 134) may be, for example, solid state drives, hard disk drives, and/or tape drives. The persistent storage devices may include other types of non-volatile or non-transitory storage mediums without departing from the invention.

In one or more embodiments of the invention, the secondary storage system (140) stores data and/or object metadata. The data may be data chunks and/or parity chunks associated with objects at previous points in time. The secondary storage system (140) includes additional persistent storage devices (142, 144) that each store all or a portion of object metadata associated with the data stored in the primary storage system (130). The object metadata (124A, 124B) stored in the storage controllers (120A, 120B) may be a portion of the object metadata stored in the secondary storage system (140). In one or more embodiments of the invention, the object metadata (124A, 124B) of the storage controllers (120A, 120B) is a most recent portion of the object metadata in the secondary storage system (140). In other words, the object entries stored in the object metadata (124A, 124B) of the storage controllers (120A, 120B) are associated with the most recent timestamps.

In one or more embodiments of the invention, after the object metadata (124A, 124B) reaches a certain size, the storage controller (120A, 120B) may remove the older object entries from the object metadata. Alternatively, the object entries are deleted from the storage controllers (120A, 120B) after the object entries have reached a predetermined age (i.e., after one week, one month, etc.). In contrast, the object metadata stored in the secondary storage system (140) is not deleted. As a result, the second storage system expands the recovery window of an object by storing a large number of object entries.

In one or more embodiments of the invention, after the data associated with the objects reach a certain size in the primary storage system (130), the storage controllers (120A, 120B) may overwrite, or otherwise delete, the older data from the primary storage system (130). Alternatively, the data chunks and/or parity chunks are deleted from the primary storage system (130) after the data chunks and/or parity chunks have reached a predetermined age (i.e., after one week, one month, etc.). In contrast, the data chunks and, optionally, the parity chunks stored in the secondary storage system (140) are not deleted (or the secondary storage may store a substantially larger number of data chunks and, optionally, parity chunks as compared to the primary storage). As a result, the second storage system expands the recovery window of an object by storing data chunks associated with all (or a large number of) versions of the objects such that the object may be replayed to a particular prior version.

Figure 2A:
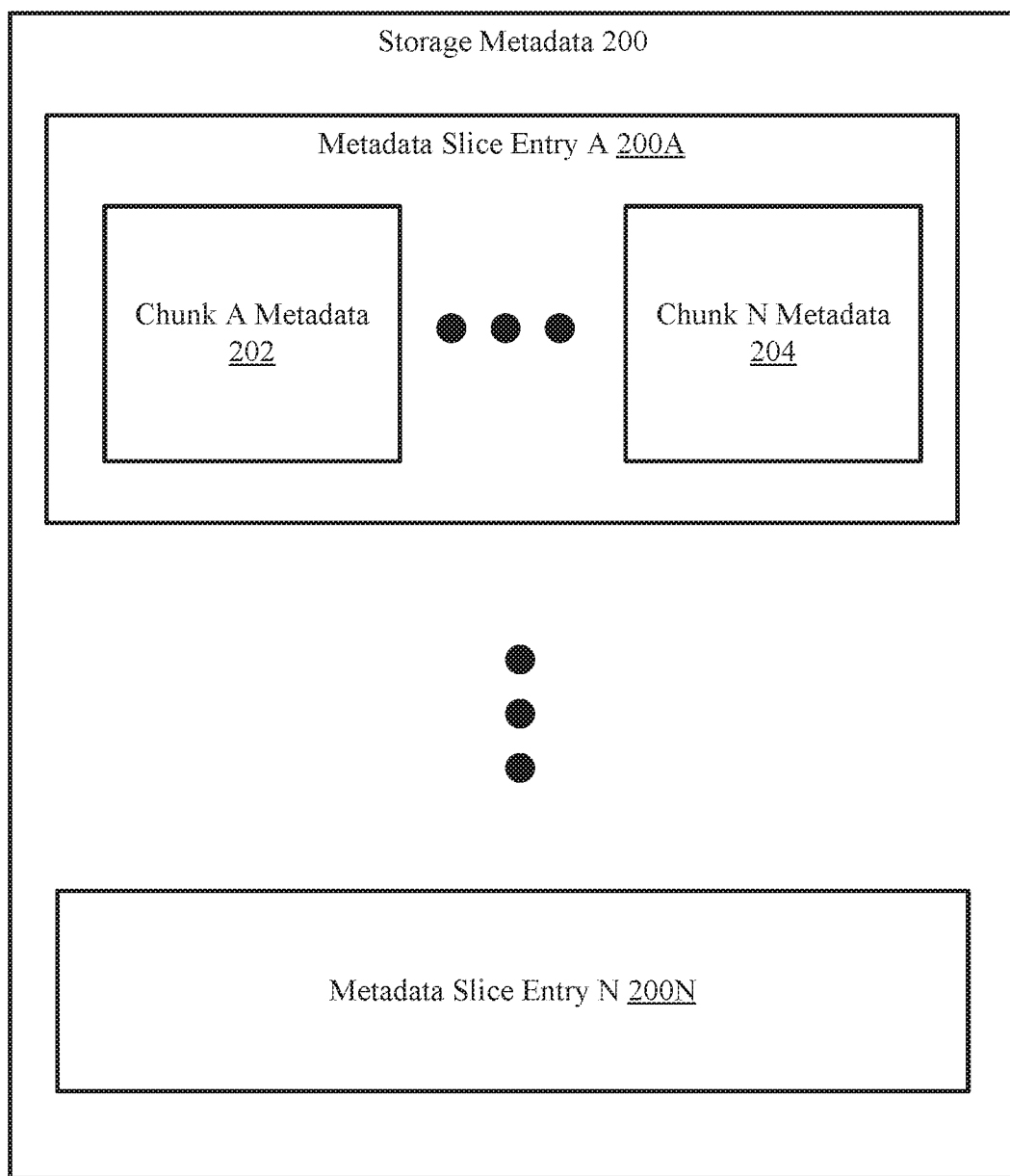
FIG. 2A shows a diagram of storage metadata in accordance with one or more embodiments of the invention.

FIG. 2A shows a diagram of storage metadata in accordance with one or more embodiments of the invention. The storage metadata (200) may be an embodiment of the storage metadata (122, 124, FIG. 1) discussed above. As discussed above, the storage metadata (200) stores information about data chunks or parity chunks. The storage information may include one or more metadata slice entries (200A, 200N). Each metadata slice entry (200A, 200N) may include chunk metadata (202, 204). Each of the aforementioned portions of the storage metadata (200) is discussed below.

In one or more embodiments of the invention, a metadata slice entry (200A, 200N) is an entry that specifies metadata associated with chunks of a data slice. The metadata slice entry (200A, 200N) includes chunk metadata (202, 204). Each chunk metadata (202, 204) may be associated with a data chunk or a parity chunk. Each chunk metadata (202, 204) may include information about a chunk such as, for example, a unique identifier (e.g., a fingerprint also referred to as a Chunk Identifier (CID)) and a storage location of the chunk. The unique identifier of a chunk may be generated using the chunk (e.g., calculated using the data of the chunk). The data chunk referenced in the chunk metadata may be either a deduplicated data chunk or non-deduplicated data chunk.

Figure 2B:
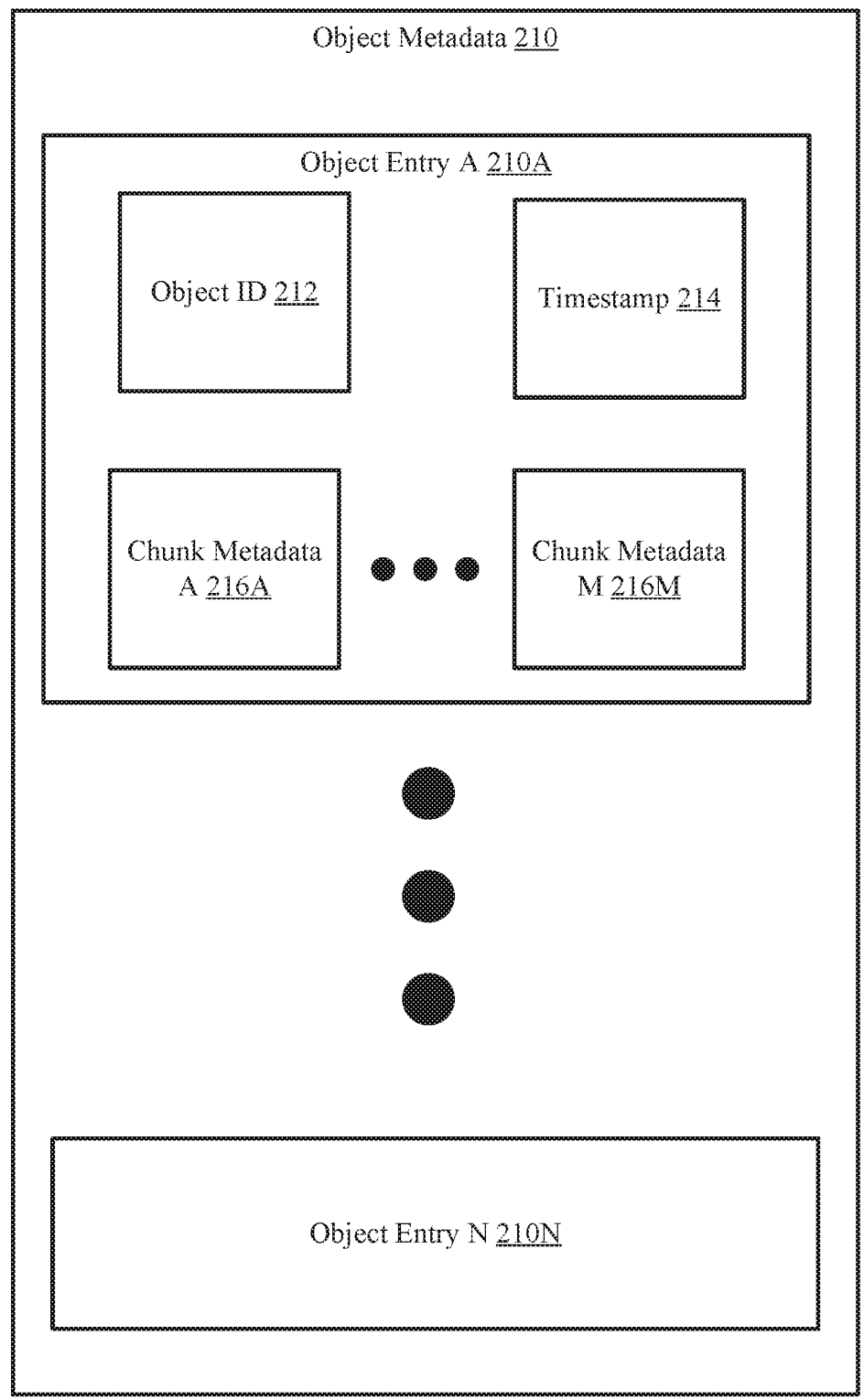
FIG. 2B shows a diagram of object metadata in accordance with one or more embodiments of the invention.

FIG. 2B shows a diagram of object metadata in accordance with one or more embodiments of the invention. The object metadata (210) may be an embodiment of the storage metadata (124A, 124B, FIG. 1) discussed above. As discussed above, the object metadata (210) stores information about objects. The object metadata (210) may include one or more object entries (210A, 210N). Each object entry (210A, 201N) may include an object ID (212), chunk metadata (216A, 216M) and a timestamp (214). Each of the aforementioned portions of the object metadata (210) is discussed below.

In one or more embodiments of the invention, the object ID (212) is an identifier that specifies an object associated with the object entry (210A, 210N). The object ID (212) may be, for example, a string of numbers, letters, symbols, or any combination thereof that uniquely identifies the object.

In one or more embodiments of the invention, the timestamp (214) specifies a point in time of the object. The timestamp (214) may be used to replay the object to a point in time. In one or more embodiments of the invention, the object is replayed to a point in time when the data associated with the object that was part of the object at the point in time is reconstructed to generate the object at the point in time. Said another way, each object includes data at different points in time, and the object may be replayed to a point in time specified by the timestamp (214).

For example, at a first point in time, the object may include a first set of data, of which there is a first chunk and a second chunk. At a second point in time, the object may include a second set of data, of which there is a first chunk and a third chunk. The third chunk may be a modified version of the second chunk. The object may be replayed to the first point in time by obtaining the first chunk and the second chunk. The object may be replayed to the second point in time by obtaining the first chunk and the third chunk. For each point in time, there may be an object entry that specifies the object, the point in time, and each chunk used to replay the object.

In one or more embodiments of the invention, the chunk metadata (216A, 216M) each corresponds to a data chunk or parity chunk associated with the object at the point in time specified by the timestamp (214). The chunk metadata may include information about the data chunk or parity chunk such as, for example, a unique identifier (e.g., a fingerprint). The unique identifier may be, for example, a string of numbers, letters, symbols, or any combination thereof that uniquely identifies the chunk.

In one or more embodiments of the invention, an object entry (210A) is associated with more than one timestamp (214). In such embodiments, each chunk metadata (216A, 216M) may specify multiple chunks associated with a point in time. After every iteration of an object (i.e., an object is associated with a new point in time), an object entry (210A, 210N) is updated with new chunk metadata (216A, 216M) that specifies the chunks of that iteration. In this manner, each object is associated with one object entry (210A, 210N).

The object metadata (210) may be organized using other schemes without departing from the invention.

FIG. 3A shows a flowchart for storing data in a data cluster in accordance with one or more embodiments of the invention. The method shown in FIG. 3A may be performed by, for example, a storage controller (120A, 120B, FIG. 1). Other components of the system illustrated in FIG. 1 may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, data is obtained from a host to be stored in a storage system. The data may be a file, a file segment, a collection of files, or any other type of data without departing from the invention.

In step 302, an erasure coding procedure is performed on the data to generate data chunks and parity chunks. In one or more embodiments of the invention, the erasure coding procedure includes dividing the obtained data into portions, referred to as data chunks. Each data chunk may include any number of data segments associated with the obtained data. The individual data chunks may then be combined (or otherwise grouped) into slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. Non-limiting examples of erasure coding algorithms are RAID-3, RAID-4, RAID-5, and RAID-6. Other erasing coding algorithms may be used without departing from the invention. Continuing with the above discussion, if the erasing code procedure is implementing RAID 3, then a single parity value is calculated. The resulting parity value is then stored in a parity chunk. If the erasure coding procedure algorithm requires multiple parity values to be calculated, then the multiple parity values are calculated with each parity value being stored in a separate data chunk.

As discussed above, the data chunks are used to generate parity chunks in accordance with the erasure coding procedure. More specifically, the parity chunks may be generated by applying a predetermined function (e.g., P Parity function, Q Parity Function, etc.), operation, or calculation to at least one of the data chunks. Depending on the erasure coding procedure used, the parity chunks may include, but are not limited to, P parity values and/or Q parity values.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q = g_0 \cdot D_0 + g_1 \cdot D_1 + D_2 + \ldots + g_{n-1} \cdot D_{n-1}$, where Q corresponds to the Q parity, g is a generator of the field, and the value of D corresponds to the data in the data chunks.

In one or more embodiments of the invention, the number of data chunks and parity chunks generated is determined by the erasure coding procedure, which may be specified by the host, by the data cluster, and/or by another entity.

In step 304, a deduplication operation is performed on the data chunks to obtain deduplicated data chunks. Additionally, a storage metadata slice entry and an object entry and generated based on the data chunks and the parity chunks along with their locations in the primary storage system. Further, an object entry is generated based data chunks (i.e., non-deduplicated data chunks) and the parity chunks with a timestamp.

In one or more embodiments of the invention, the deduplication is performed by identifying the data chunks of the obtained data and assigning a fingerprint to each data chunk. A fingerprint is a unique identifier that may be stored in metadata of the data chunk. The storage controller performing the deduplication may generate a fingerprint for a data chunk and identify whether the fingerprint matches an existing fingerprint stored in the storage metadata. If the fingerprint matches an existing fingerprint, the data chunk may be deleted, as it is already stored in the data cluster. If the fingerprint does not match any existing fingerprints, the data chunk may be stored as a deduplicated data chunk. Additionally, the fingerprint of each data chunk is stored in a storage metadata slice entry of the storage metadata. A fingerprint (or other unique identifier) of each parity chunk is also generated and stored in the storage metadata slice entry.

In one or more embodiments of the invention, the deduplicated data chunks collectively make up the deduplicated data. In one or more embodiments of the invention, the deduplicated data chunks are the data chunks that were not deleted during deduplication.

In step 306, the deduplicated data chunks and parity chunks are stored across persistent storage devices in the storage system. As discussed above, the deduplicated data chunks and the parity chunks are stored in a manner that minimizes reads and writes from the storage system. In one embodiment of the invention, this minimization is achieved by storing data chunks and parity chunks, which are collective referred to as a data slice (or slice), in the same manner as a prior version of the data slice. The storage controller may use, as appropriate, storage metadata for the previously stored data chunks and parity chunks to determine where to store the data chunks and parity chunks in step 306.

More specifically, in one embodiment of the invention, if the deduplicated data chunks and parity chunks are the first version of a data slice (as opposed to a modification to an existing/previously stored data slice), then the deduplicated data chunks and parity chunks may be stored across the persistent storage devices in the primary storage system and across persistent storage devices in a secondary storage system. The location in which the data chunk or parity chunk is stored is specified in the storage metadata slice entry. The scenario does not require the storage controller to use location information for previously stored data chunks and parity chunks.

However, if the deduplicated data chunks and parity chunks are the second version of a slice (e.g., a modification to a previously stored slice), then the deduplicated data chunks and parity chunks are stored across the persistent storage devices of the primary storage system and across persistent storage devices across the secondary storage system using prior stored location information. The location in which the data chunk or parity chunk is stored is specified in the storage metadata slice entry. In one or more embodiments of the invention, the previous version(s) of the data stored in the primary storage system is overwritten or otherwise removed. In this manner, only a most recent version of the object is stored in the primary storage system. In contrast, the secondary storage system stores all previous versions (or a greater number of prior versions) of an object so that the secondary storage system may be used for object replay to a previous point in time.

For example, consider a scenario in which the first version of the slice includes three data chunks (D1, D2, D3) and one parity chunk (P1) and that they were stored in the primary storage system as follows: storage device 1 stores D1, storage device 2 stores D2, storage device 3 stores D3, and storage device 4 stores P1. Further, in this example, a second version of the slice is received that includes three data chunks (D1, D2', D3) and one newly calculated parity chunk (P1'). If deduplication is implemented, only D2' and P1' need to be stored; otherwise, D1 and D3 may be stored as well. Based on the prior storage locations (also referred to as locations) of the data chunks (D1, D2, and D3) and parity chunks (P1) for the first version of the slice, D2' is stored on storage device 2 and P1' is stored on storage device 4. By storing the D2' on storage device 2 and P1' on storage device 4 the data chunks and parity chunks associated with the second slice satisfy the condition that all data chunks and parity chunks for the second version of the slice are being stored in separate persistent storage devices. If the location information was not taken into account, then the entire slice (i.e., D1, D2', D3, and P1') would need to be stored in order to guarantee that the requirement that all data chunks and parity chunks for the second version of the slice are being stored in separate persistent storage devices is satisfied.

In one embodiment of the invention, the storage controller includes functionality to determine whether a given data chunk is a modified version of a previously stored data chunk. Said another way, after the data is received from a host divided into data chunks and grouped into slices, the storage controller includes functionality to determine whether a slice is a modified version of a prior stored slice. The storage controller may use the fingerprints of the data chunks within the slice to determine whether the slice is a modified version of a prior stored slice. Other methods for determining whether a data chunk is a modified version of a prior stored data chunk and/or whether a slice is a modified version of a prior slice without departing from the invention.

In step 308, a copy of the object entry is stored in the secondary storage system via a continuous data protection (CDP) interceptor of the storage controller. The storage controller, or a CDP interceptor of the storage controller, may send the copy to a persistent storage device in the secondary storage device to be stored. A copy of the object entry may also be distributed to a second storage controller (or to multiple other storage controllers).

Additionally, the copy of the object entry may be further stored in memory of the storage controller. Based on the availability of storage in the storage controller, the copy of the object entry may be eventually deleted from the memory of the storage controller while remaining in the secondary storage system.

In step 310, a transfer of a copy of storage metadata to a second storage controller (or to multiple other storage controllers) is initiated. In one or more embodiments of the invention, the storage metadata is distributed by generating a copy of the storage metadata that includes the storage metadata slice entry generated in step 304 and sending the copy of storage metadata to a second storage controller (or to multiple other storage controllers). In this manner, a copy of the storage metadata is stored in multiple storage controllers in the event of a storage metadata failure in one storage controller.

While FIG. 3A describes erasure coding and deduplicating the data, embodiments of the invention may be implemented where the data is only erasure coded and not deduplicated. In such embodiments, step 304 includes generating a storage metadata slice using non-deduplicated data chunks and parity chunks and step 306 includes distributing non-deduplicated data chunks and parity chunks.

FIG. 3B shows a flowchart for performing an object replay in accordance with one or more embodiments of the invention. The method shown in FIG. 3B may be performed by, for example, a CDP Interceptor (126A, 126B). Other components of the system illustrated in FIG. 1 may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, an object replay request is obtained. The object replay request may be obtained from a host. The object replay request may specify an object and a point in time in which to replay the object.

In step 322, an object ID and timestamp associated with the object replay request are identified (or otherwise obtained) from the object reply request and provided to the secondary storage system.

In step 324, one or more object entries associated with the object ID and timestamp are obtained from the secondary storage system.

In step 326, data chunks are identified to service the object replay request using the object entry (or entries) obtained from the secondary storage system. In one or more embodiments of the invention, the object entry (or entries) includes chunk metadata that specifies the data chunks (e.g., as CIDs) of the object at the point in time.

In step 328, the identified data chunks are obtained from the primary storage system and/or the secondary storage system using storage metadata. In one or more embodiments of the invention, the storage controller uses the obtained CIDs to identify the corresponding chunk metadata. The chunk metadata includes the locations of the data chunks. The locations of the data chunks are then used by the storage controller to obtain the data chunks from the primary storage system.

In one or more embodiments of the invention, only a portion of data chunks need to be obtained from the secondary storage system. In other words, if a portion of the identified data chunks reside in the primary storage system (e.g., the identified data chunks have not been deleted from the primary storage system), the remaining identified data chunks are obtained from the secondary storage system. In this manner, the amount of data obtained from the secondary storage system is reduced.

In step 330, object regeneration is performed using the obtained data chunks to generate an object associated with the object replay request. The object regeneration may include combining the obtained data chunks so that the data chunks collectively make up the object. In one or more embodiments of the invention, the object is regenerated using the erasure coding algorithm applied to the data chunks and parity chunks of the object when it was initially stored in the primary storage.

In one or more embodiments of the invention, the object is provided to the host. The CDP Interceptor, or another entity, may send the object to the host with confirmation that the object replay request has been serviced.

Example 1

Figure 4A:
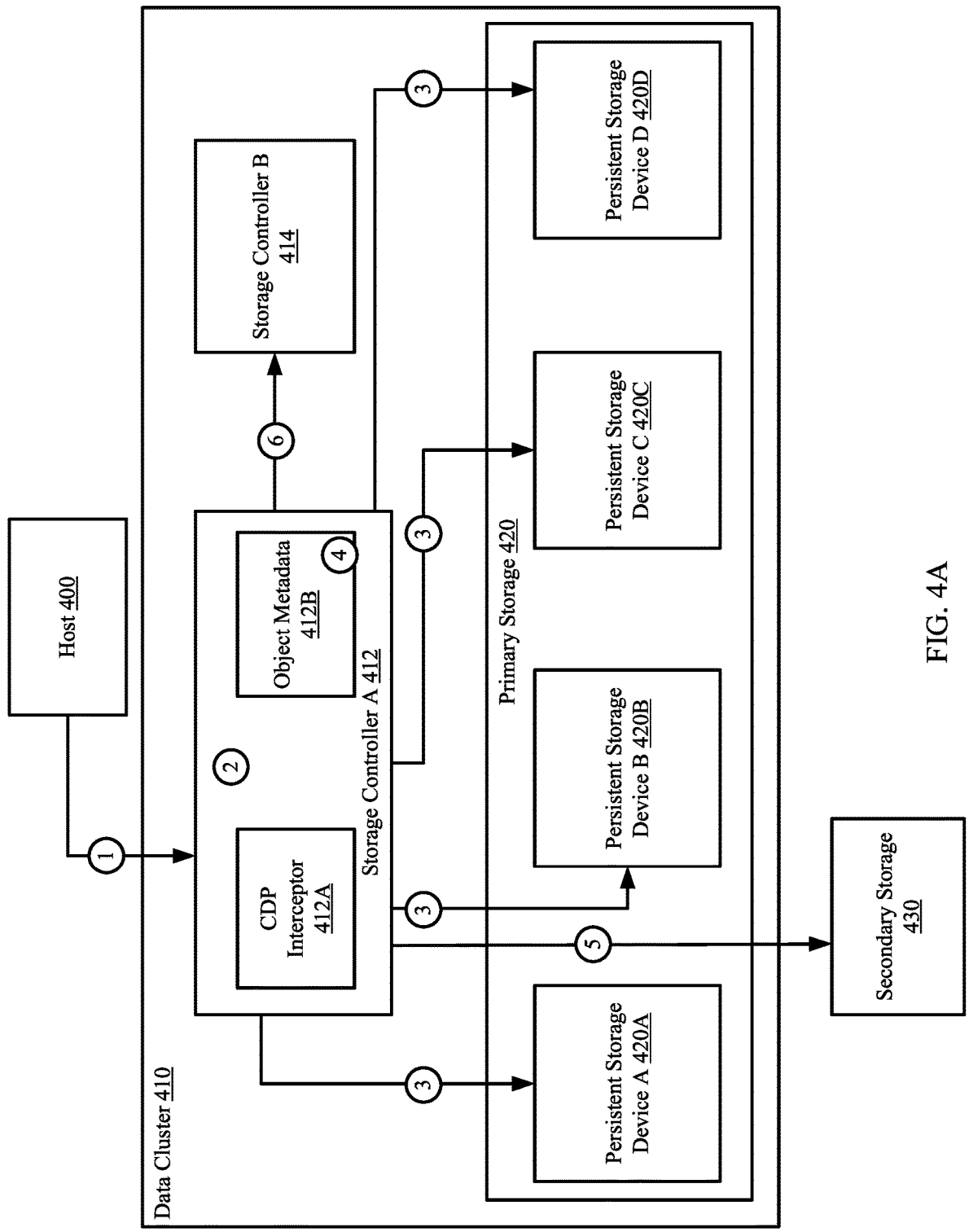
FIGS. 4A-4B show an example in accordance with one or more embodiments of the invention.
Figure 4B:
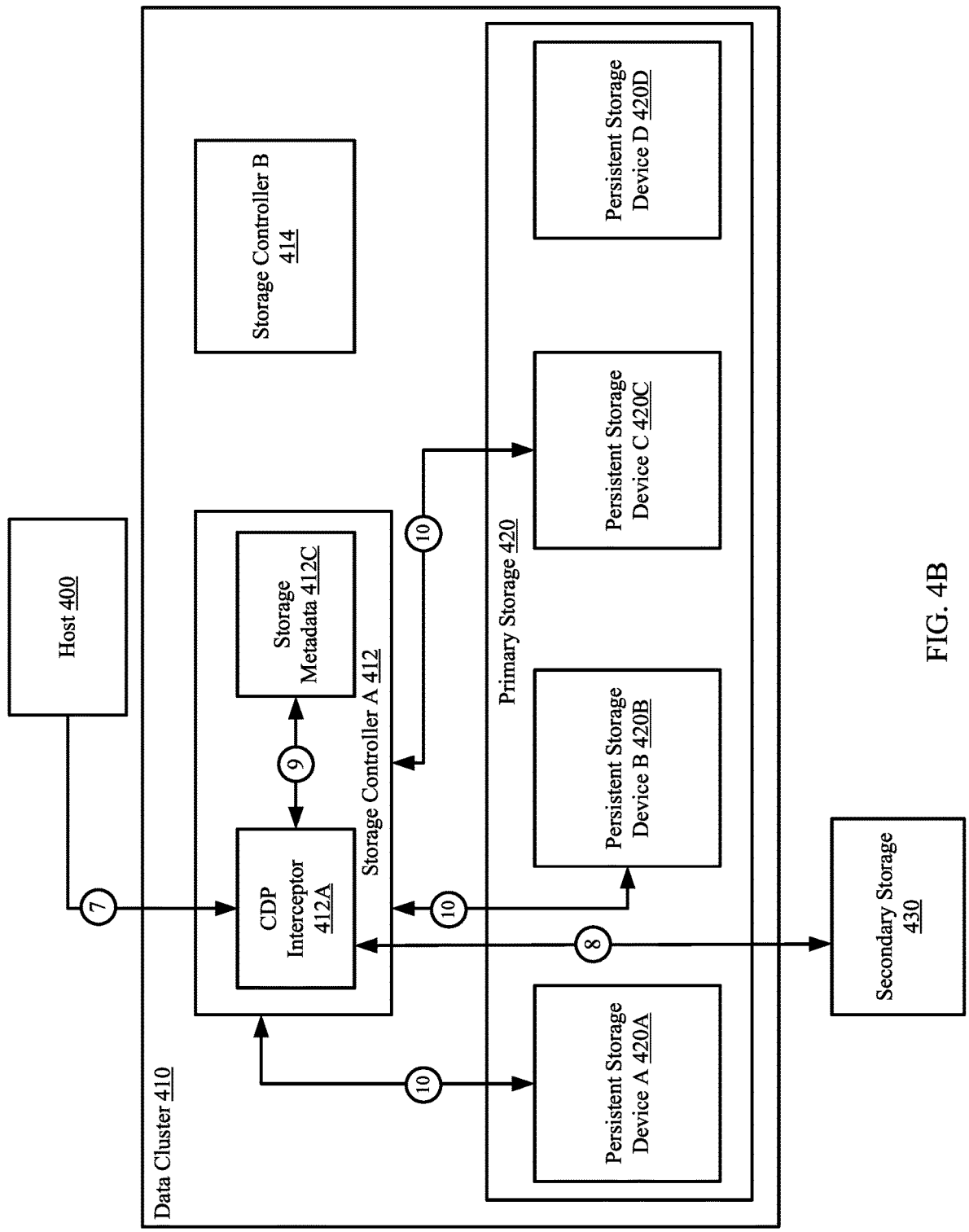

The following section describes an example. The example is not intended to limit the invention. The example is illustrated in FIGS. 4A-4B. Turning to the example, consider a scenario in which a data cluster obtains data (which is an object) from a host. The host requests the object be stored in the data cluster in a 3:1 erasure coding procedure. FIG. 4A shows a diagram a system in accordance with one or more embodiments of the invention. The host (400) sends the request to a first storage controller (412) of the data cluster (410) [1].

The first storage controller (412) obtains the request and performs the method of FIG. 3A to store the obtained object. Specifically, the storage controller performs an erasure coding on the object [2]. In this example, assume that the erasure coding procedure includes implementing RAID 3. The result of the erasure coding procedure is a group of three data chunks and a parity chunk. The data chunks and parity chunk further go under a deduplication operation to obtain deduplicated data chunks. Because this file is not part of a previously-stored file, all three data chunks are deduplicated data chunks.

The deduplicated data chunks and the parity chunk are each stored in a unique persistent storage device (420A, 420B, 420C, 420D) of the primary storage system (420) [3]. Specifically, a first deduplicated data chunk is stored in persistent storage device A (420A), a second deduplicated data chunk is stored in persistent storage device B (420B), a third deduplicated data chunk is stored in persistent storage device C (420C), and the parity chunk is stored in persistent storage device D (420D).

In addition to storing the deduplicated data chunks and the parity chunks, the storage controller (412) generates a storage metadata slice entry in storage metadata (not shown) and an object entry in the object metadata (412B) [4]. A unique identifier of each deduplicated data chunk and parity chunk is stored in storage metadata slice entry. Additionally, the storage controller (412) further stores the object entry and a copy of the data chunks and parity chunk in the secondary storage (430) [4]. The object entry specifies the data and a first point in time. The storage controller (412) updates a second storage controller (414) by sending a copy of the storage metadata to the second storage controller (414) [6].

FIG. 4B shows a diagram of the system. The host (400) sends an object replay request to obtain the object in the first point in time [7]. The CDP interceptor (412A) uses the object metadata stored in the secondary storage (430) to identify an object entry associated with the object specified in the object replay request [8]. The object entry specifies the data chunks of the object and the timestamp associated with the first point in time.

After identifying the object entry from the secondary storage (430), the CDP interceptor (412A) analyzes the storage metadata (412C) to identify a storage location of the identified data chunks [9]. The storage controller (412), using the storage locations from the storage metadata (412C), obtains the data chunks from the persistent storage devices (420A, 420B, 420C) storing the data chunks, performs an object regeneration in accordance with FIG. 3B. The storage controller (412) subsequently sends the regenerated object to the host (400).

End of Example 1

Example 2

The following section describes an example. The example is not intended to limit the invention. Consider a scenario in which an object is associated with three object entries each at a different point in time. At the first point in time (T1), the object may be associated with data chunks D1, D2, and D3. At the second point in time (T2), the object is associated with data chunks D1*, D2, and D3, wherein D1* is a modification of D1. At the third point in time (T3), the object is associated with D1*, D2*, and D3, wherein D2* is a modification of D2.

At T1, the primary storage system and the secondary storage system both store a copy of D1, D2, and D3. At T2, the primary storage system stores D1*, D2, and D3; the secondary storage system stores D1, D1*, D2, and D3 and a copy of the object entry at T1. If deduplication is not implemented, the secondary storage may store D1, D2, and D3, D1*, and a second copy of D2 and D3 and a copy of object entries at T1 and at T2. At T3, the primary storage system stores D1*, D2*, and D3; the secondary storage system stores D1, D1*, D2, D2* and D3 copies of the object entries at times T1, T2, and T3. If deduplication is not implemented, the secondary storage may store D1, D2, and D3, D1*, a second copy of D2 and D3, D2*, a second copy of D1*, and a third copy of D3.

Suppose that a host wants to read the object at the T3. A CDP Interceptor uses the object metadata (stored in secondary storage) and storage metadata to obtain the corresponding data chunks (i.e., D1*, D2*, and D3) from the primary storage system and provides the data chunks to the host.

The host may then request to access the data at T2. The CDP Interceptor, using the object entry associated with T2 (stored in the secondary storage), identifies data chunks D1*, D2, and D3 as the data chunks associated with the object at the second point in time. However, the CDP Interceptor is aware that the host has recently been provided with data chunks D1*, D2*, and D3. Therefore, the CDP Interceptor determines that it only needs to obtain the data chunk D2 because it is the only data chunk that is different between the object at the T2 and T3. Subsequently, the CDP Interceptor obtains the corresponding data chunk (i.e., data chunk D2) from the secondary storage system and provides the data chunk to the host. In this manner, the host also has all of the data chunks associated with the object at T2. In this manner, the CDP Interceptor is able to service the second request by the host without having to obtain D1* and D3 a second time.

End of Example 2

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of storing data in a data cluster. The efficiency is improved by introducing a secondary storage system that stores data and object metadata associated with objects at multiple points in time in a traditional data cluster. Embodiments of the invention, by utilizing the secondary storage system, may extend a window of time in which the object may be replayed while maintaining the traditional storage capabilities of a primary storage system that stores the data associated with the objects at a most recent time. Embodiments of the invention may utilize the data stored in the primary storage system and the object metadata stored in the secondary storage system to replay an object to a previous specified point in time.

Further, embodiments of the invention improve the storage of data by equipping storage controllers that manage the storage of the data with continuous data protection (CDP) interceptors that manage the storage of the object metadata and the replay of the objects to the specified points in time. In this manner, the storage controllers manage to store both data associated with the objects and object metadata associated with the objects without sacrificing the processing capabilities or efficiency of the storage controllers.

Thus, embodiments of the invention may address the problem of inefficient use of computing resources. This problem arises due to the technological nature of the environment in which data is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by a first storage controller, a write request associated with an object from a host;
applying an erasure coding procedure to data associated with the write request to obtain a plurality of data chunks and at least one parity chunk, wherein the object comprises the data;
deduplicating the plurality of data chunks to obtain a plurality of deduplicated data chunks;
generating storage metadata associated with the plurality of data chunks and the at least one parity chunk,
wherein the storage metadata comprises a metadata slice entry,
wherein the metadata slice entry comprises chunk metadata of the metadata slice entry,
wherein the chunk metadata of the metadata slice entry specifies storage locations of the plurality of data chunks and the at least one parity chunk;
generating an object entry associated with a second plurality of data chunks,
wherein the object entry specifies at least an object identifier (ID) associated with the object, a timestamp, and chunk metadata of the object entry,
wherein the chunk metadata of the object entry comprises at least one chunk identifier for at least one of the second plurality of data chunks,
wherein the at least one chunk identifier uniquely identifies the at least one of the second plurality of data chunks,
wherein the plurality of data chunks is at least a portion of the second plurality of data chunks, and
wherein the second plurality of data chunks corresponds to a point in time associated with the timestamp;
storing, across a first plurality of persistent storage devices, the plurality of deduplicated data chunks and the at least one parity chunk; and
storing, via the first storage controller, in at least one of a second plurality of persistent storage devices the object entry.

2. The method of claim 1, further comprising:
sending a copy of the storage metadata and a copy of the object entry to a second storage controller; and
sending a copy of the storage metadata and a copy of the object entry to at least one of the second plurality of persistent storage devices.

3. The method of claim 1, further comprising:
obtaining an object replay request;
identifying an object associated with the object replay request;
obtaining at least one object entry associated with the object from at least one of the second plurality of persistent storage devices;
identifying the second plurality of data chunks associated with the object using at least a portion of the object replay request and the at least one object entry; and
performing an object regeneration using the second plurality of data chunks.

4. The method of claim 3, wherein the object replay request specifies a time stamp and an object identifier (ID) that identifies the object.

5. The method of claim 3, wherein performing the object regeneration using the second plurality of data chunks comprises:
identifying a location of at least one of the second plurality of data chunks using the storage metadata;
obtaining the at least one of the second plurality of data chunks from the location, wherein the location is in one of the first plurality of persistent storage devices.

6. The method of claim 1, wherein the first plurality of persistent storage devices and the second plurality of persistent storage devices are operatively connected to the first storage controller and the second storage controller.

7. A non-transitory computer readable medium comprising computer readable program code, which when executed by a computer processor enables the computer processor to perform a method for managing data, the method comprising:
   obtaining, by a first storage controller, a write request associated with an object from a host;
   applying an erasure coding procedure to data associated with the write request to obtain a plurality of data chunks and at least one parity chunk, wherein the object comprises the data;
   deduplicating the plurality of data chunks to obtain a plurality of deduplicated data chunks;
   generating storage metadata associated with the plurality of data chunks and the at least one parity chunk,
      wherein the storage metadata comprises a metadata slice entry,
      wherein the metadata slice entry comprises chunk metadata of the metadata slice entry,
      wherein the chunk metadata of the metadata slice entry specifies storage locations of the plurality of data chunks and the at least one parity chunk;
   generating an object entry associated with a second plurality of data chunks,
      wherein the object entry specifies at least an object identifier (ID) associated with the object, a timestamp, and chunk metadata of the object entry,
      wherein the chunk metadata of the object entry comprises at least one chunk identifier for at least one of the second plurality of data chunks,
      wherein the at least one chunk identifier uniquely identifies the at least one of the second plurality of data chunks,
      wherein the plurality of data chunks is at least a portion of the second plurality of data chunks, and
      wherein the second plurality of data chunks corresponds to a point in time associated with the timestamp;
   storing, across a first plurality of persistent storage devices, the plurality of deduplicated data chunks and the at least one parity chunk; and
   storing, via the first storage controller, in at least one of a second plurality of persistent storage devices the object entry.

8. The non-transitory computer readable medium of claim 7, further comprising:
   sending a copy of the storage metadata and a copy of the object entry to a second storage controller; and
   sending a copy of the storage metadata and a copy of the object entry to at least one of the second plurality of persistent storage devices.

9. The non-transitory computer readable medium of claim 7, further comprising:
   obtaining an object replay request;
   identifying an object associated with the object replay request;
   obtaining at least one object entry associated with the object from at least one of the second plurality of persistent storage devices;
   identifying the second plurality of data chunks associated with the object using at least a portion of the object replay request and the at least one object entry; and
   performing an object regeneration using the second plurality of data chunks.

10. The non-transitory computer readable medium of claim 9, wherein the object replay request specifies a time stamp and an object identifier (ID) that identifies the object.

11. The non-transitory computer readable medium of claim 9, wherein performing the object regeneration using the second plurality of data chunks comprises:
   identifying a location of at least one of the second plurality of data chunks using the storage metadata;
   obtaining the at least one of the second plurality of data chunks from the location, wherein the location is in one of the first plurality of persistent storage devices.

12. The non-transitory computer readable medium of claim 7, wherein the first plurality of persistent storage devices and the second plurality of persistent storage devices are operatively connected to the first storage controller and the second storage controller.

13. A data cluster, comprising:
   a first storage controller;
   a second storage controller;
   a first plurality of persistent storage devices; and
   a second plurality of persistent storage devices,
   wherein the first storage controller is programmed to:
      obtain a write request associated with an object from a host;
      apply an erasure coding procedure to data associated with the write request to obtain a plurality of data chunks and at least one parity chunk, wherein the object comprises the data;
      deduplicate the plurality of data chunks to obtain a plurality of deduplicated data chunks;
      generate storage metadata associated with the plurality of data chunks and the at least one parity chunk,
         wherein the storage metadata comprises a metadata slice entry,
         wherein the metadata slice entry comprises chunk metadata of the metadata slice entry,
         wherein the chunk metadata of the metadata slice entry specifies storage locations of the plurality of data chunks and the at least one parity chunk;
      generate an object entry associated with a second plurality of data chunks,
         wherein the object entry specifies at least an object identifier (ID) associated with the object, a timestamp, and chunk metadata of the object entry,
         wherein the chunk metadata of the object entry comprises at least one chunk identifier for at least one of the second plurality of data chunks,
         wherein the at least one chunk identifier uniquely identifies the at least one of the second plurality of data chunks,
         wherein the plurality of data chunks is at least a portion of the second plurality of data chunks, and
         wherein the second plurality of data chunks corresponds to a point in time associated with the timestamp;
      store, across the first plurality of persistent storage devices, the plurality of deduplicated data chunks and the at least one parity chunk; and
      store the object entry in at least one of the second plurality of persistent storage devices.

14. The data cluster of claim 13, wherein the first storage controller is further programmed to:
   send a copy of the storage metadata and a copy of the object entry to the second storage controller; and
   send a copy of the storage metadata and a copy of the object entry to at least one of the second plurality of persistent storage devices.

15. The data cluster of claim 13, wherein the first storage controller is further programmed to:
   obtain an object replay request;

identify an object associated with the object replay request;
obtain at least one object entry associated with the object from at least one of the second plurality of persistent storage devices;
identify the second plurality of data chunks associated with the object using at least a portion of the object replay request and the at least one object entry; and
perform an object regeneration using the second plurality of data chunks.

16. The data cluster of claim 15, wherein performing the object regeneration using the second plurality of data chunks comprises:
identifying a location of at least one of the second plurality of data chunks using the storage metadata;
obtaining the at least one of the second plurality of data chunks from the location, wherein the location is in one of the first plurality of persistent storage devices.

17. The data cluster of claim 15, wherein the object replay request specifies a time stamp and an object identifier (ID) that identifies the object.

\* \* \* \* \*